APPARATUS FOR CHECKING TELEVISION WAVEFORMS
Filed Aug. 19, 1959
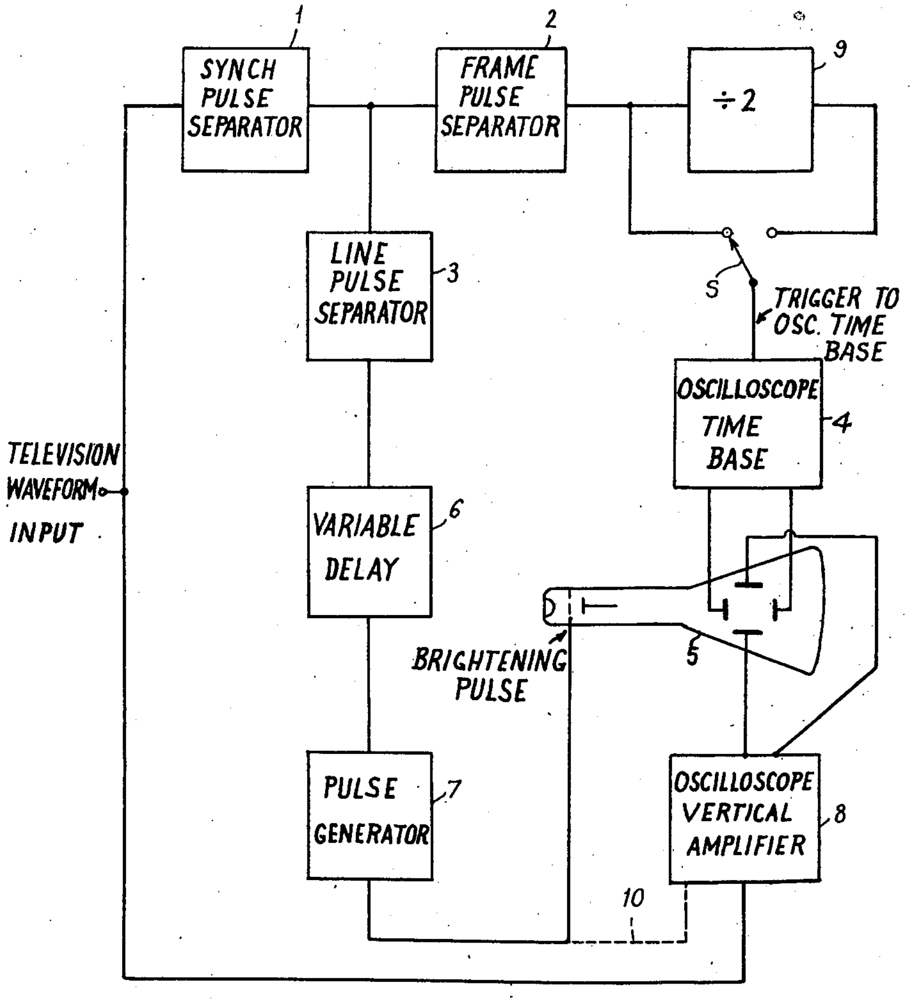
Inventor
L.W. Germany
By Holcomb, Wetherill & Brisebois
Attorney United States Patent Office 3,072,739

Patented Jan. 8, 1963

3,072,739

APPARATUS FOR CHECKING TELEVISION WAVEFORMS

Leslie W. Germany, Cambridge, England, assignor to Pye Limited, Cambridge, England, a company of Great Britain Filed Aug. 19, 1959, Ser. No. 834,688
Claims priority, application Great Britain Aug. 25, 1958
6 Claims. (Cl. 178—6)

When analysing the waveform generated by a television system, use is often made of a line strobe or line selecting oscilloscope to examine one complete line or part of a line. By this method, the picture elemental response of the system may be analysed in the direction of the scanning lines. By suitable adjustment of the line selecting controls, any line in the television picture can be observed.

In order to analyse certain electron-optical effects in the television scanning system, without the distorting effects of high frequency amplitude and phase response of the video amplifier affecting the results, it has been found desirable to examine the picture elemental response of the system in the vertical or frame direction. The object of this invention is to provide an apparatus for achieving this.

The synchronising pulses are separated from the composite television waveform and the line and frame components taken out separately. The frame component is applied to trigger the time base scanning circuit of the oscilloscope for examination of a complete picture, or if it be desired to examine alternate frames in an interlaced television system then this trigger may be applied through a binary divider stage. The line component of the synchronising pulses is applied to trigger a generator for producing a selector pulse which has a width of approximately one picture element. A variable delay device is provided for delaying the selector pulse with respect to the line synchronising pulse. The selector pulse is applied to select a particular element of each line to be reproduced on the oscilloscope for example as a brightening pulse to the control electrode of the oscilloscope tube.

It will be seen that as this delay is varied, a brightening pulse occurring at the same time interval on each line will be made to traverse the screen of the tube. Normally an oscilloscope triggered at frame frequency will present the waveform of a complete television picture, but if brightened by this brightening pulse it will only present a section in the vertical or frame direction through the picture equivalent to one picture element wide. It will be apparent that if the time base voltage is applied to the horizontal deflecting plates of the oscilloscope tube and the television waveform to the vertical deflecting plates of the tube, then the section through one frame of the television waveform will appear as a horizontal trace across the screen of the tube. However if the time base voltage is applied to the vertical deflecting plates of the tube and the television waveform is applied to the horizontal deflecting plate of the tube, then the section through one frame of the television waveform will appear as a vertical trace on the screen of the tube.

In order that the invention may be more fully understood reference will now be made to the accompanying drawing which is a block circuit diagram of one embodiment of apparatus according to this invention for checking a television waveform.

Referring to the single figure of drawing the complete television waveform is fed to a synchronising pulse separator circuit 1, which separates the synchronising pulses from the picture signal component, the output synchronising pulses from the separator 1 being applied to a frame pulse separator 2 and a line pulse separator 3. The output from the frame pulse separator 2 is applied through a switch S to trigger the time base 4 of the cathode ray tube 5 of the oscilloscope on which the examination of the television waveform is to be carried out. The time base voltage is applied to the horizontal deflecting plates of the tube. The output from the line pulse separator 3 is fed through a variable delay device 6 to a pulse generator 7 generating selector pulses which have a width of approximately one picture element of the television picture signal to be examined, which selector pulses are applied as brightening pulses to the grid of the cathode ray tube 5. The complete television waveform is also applied through the amplifier 8 to the vertical deflecting plates of the cathode ray tube 5. By appropriate biasing of the cathode ray tube and adjustment of the variable delay device, the selector pulses can be applied to select any particular element of each line to be reproduced on the cathode ray tube, the selected elements appearing as a horizontal trace on the tube. The arrangement as so far described provides for the examination of a picture element in each line of a complete television picture. In order to examine a section of alternate frames in an interlaced television system, the switch S is moved to its other postion so that the frame pulses are now fed through the binary divider stage 9 whereby the oscilloscope time base 4 is only triggered by alternate frame pulses and therefore a section of only alternate frames appear for examination on the cathode ray tube. It will be understood that the oscilloscope time base sweeps across the face of the cathode ray tube at the same speed as when the binary divider stage 9 is out of circuit. This results in a section being displayed of that frame which occurs after the synchronising pulse which triggers the oscilloscope time base. The section of the next successive frame will not be displayed.

Whilst a particular embodiment has been described it will be understood that various modifications may be made without departing from the scope of this invention. Thus instead of feeding the selector pulses to the grid of the cathode ray tube 5 to act as brightening pulses they could be fed through connection 10, shown in broken lines to gate the amplifier 8 as to select the desired portion of the picture signals for examination.

I claim:

1. Apparatus for examining a television waveform, comprising means for separating the line and frame synchronising pulses from the picture signals and from each other, means for applying the frame synchronising pulses to trigger a time base of an oscilloscope on which the examination of the television waveform is to be effected, means for applying the line synchronising pulses to trigger a generator producing a selector pulse and variable delay means for delaying the selector pulses with respect to the line synchronising pulses, so that the selector pulses can be applied to the oscilloscope to select a particular element of each line of the television picture signal to be reproduced on the oscilloscope.

2. Apparatus as claimed in claim 1, in which each selector pulse has a width corresponding approximately to the width of one picture element in the television waveform to be examined.

3. Apparatus as claimed in claim 1, in which the line synchronising pulses are applied to the selector pulse generator through a variable delay device.

4. Apparatus as claimed in claim 1, in which the selector pulses are applied as brightening pulses to a control electrode of the cathode ray tube of the oscilloscope.

5. Apparatus as claimed in claim 1, in which the selector pulses are employed to gate the picture signal of the television waveform to select the desired portion of each line to be reproduced on the cathode ray tube of the oscilloscope.

6. Apparatus as claimed in claim 1, in which the frame synchronizing pulses are applied to trigger the oscilloscope time base through a divide-by-two stage in order to permit the examination of alternate frames in an interlaced television system.

References Cited in the file of this patent

UNITED STATES PATENTS

| | | |
|---|---|---|
| 2,595,646 | Doba | May 6, 1952 |
| 2,615,979 | Abbenhouse | Oct. 28, 1952 |